United States Patent [19]

Touval

[11] 3,926,883

[45] Dec. 16, 1975

[54] FLAME RETARDANT COMPOSITIONS
[75] Inventor: Irving Touval, Edison, N.J.
[73] Assignee: M&T Chemicals Inc., Greenwich, Conn.
[22] Filed: Sept. 11, 1974
[21] Appl. No.: 504,863

Related U.S. Application Data
[63] Continuation-in-part of Ser. No. 68,538, Aug. 31, 1970, abandoned.

[52] U.S. Cl... 260/28.5 A; 260/28.5 B; 260/28.5 D; 260/45.7 P; 260/45.7 R; 260/45.75 W; 260/45.75 D; 260/45.85 V; 260/45.95 G
[51] Int. Cl.$^2$.... C08K 3/20; C08K 3/24; C08K 5/02
[58] Field of Search............260/45.75 W, 45.75 D, 260/45.7 R, 45.7 P, 45.95 G, 45.85 V, 260/28.5 B, 28.5 D, 28.5 A

[56] References Cited
UNITED STATES PATENTS

| | | | |
|---|---|---|---|
| 1,990,292 | 2/1935 | Leatherman | 260/45.75 |
| 2,286,744 | 6/1942 | Leatherman | 260/45.75 |
| 2,610,920 | 9/1952 | Hopkinson | 260/45.75 |
| 3,202,567 | 8/1965 | Muri et al. | 260/45.75 |
| 3,524,761 | 8/1970 | Humphrey | 260/45.75 |

FOREIGN PATENTS OR APPLICATIONS
1,080,468  8/1967  United Kingdom

OTHER PUBLICATIONS

The Chemistry and Uses of Fire Retardants– Lyons; 1970; pp. 80–88, 221 and 222.

Combustion and Flame–14, pp. 135 to 139; 1966; article by Fenimore.

Primary Examiner—V. P. Hoke
Attorney, Agent, or Firm—Robert P. Auber; Kenneth G. Wheeless; Robert Spector

[57] ABSTRACT

Novel tin containing flame retardants for synthetic polymers that exhibit reduced tin content simultaneously with effective flame retarding characteristics consist of one part by weight of hydrated stannic oxide in combination wtih four parts of a member selected from the group consisting of colemanite (calcium borate hexahydrate), zinc oxide and mixtures of zinc oxide and magnesium oxide. Polymer compositions containing these flame retardants possess improved flame retarding characteristics simultaneously with effective color stability in the presence of heat and at a substantial reduction in cost over polymers containing known flame retarding compositions.

9 Claims, No Drawings

FLAME RETARDANT COMPOSITIONS

BACKGROUND

This application is a continuation-in-part of application, Ser. No. 68,538, filed Aug. 31, 1970 now abandoned.

This invention relates to novel flame retardant polymer compositions. More particularly, this invention relates to tin-containing flame retardants with significantly less tin than required in prior art formulations to provide an effective level of flame retardancy for synthetic polymers.

With the increasing use of synthetic polymers, as in the construction industry, for example, the level of flame retardancy exhibited by these materials have become increasingly important. Many efforts have therefore been made to develop flame retardant additives for synthetic polymers which will improved flame retardancy without imparting undesirable properties to the final resin composition, such as, for example, interference with a desired color, and even more importantly affecting the tensile properties of the polymer being used so as to decrease its effectiveness for a given end use. An equally important consideration is the cost of a flame retarding additive, particularly in large scale operations involving processing literally thousands of pounds of polymer.

Various antimony compounds, particularly oxides, effectively flame retard polymer compositions when used in combination with an organic halogen source. These flame retardants do not adversely affect the stability of polymer compositions in the environments encountered during their processing and use. However, antimony compounds have recently become relatively scarce and expensive. The use of antimony-containing compounds for flame retarding may therefore not be economically feasible for some large scale processes.

Various substituted for antimony compounds have been proposed, including zinc compounds, certain hydrated borates, barium oxide, hydrated tin oxide and combinations of these compounds. While many of these substitutes are lower in cost relative to antimony compounds, they have not proven to be equivalent to antimony compounds with regard to flame retardancy. Some substitutes which are equivalent in performance interfere with the mechanical and/or esthetic characteristics of the polymer composition. Of the various proposed substitutes, tin compounds have proved most effective. However, certain tin compounds, such as hydrated tannic oxide, for example, are almost as expensive as antimony thus eliminating any economic advantage for a weight-for-weight substitution of a tin compound for a antimony compound.

An objective of this invention is to provide tin-containing flame retardants that offer performance equivalent to that of antimony compounds at a lower cost.

SUMMARY OF THE INVENTION

The foregoing objective is realized by combining one part by weight of hydrated stannic oxide with four parts of a second component selected from the group consisting of colemanite (calcium borate hexahydrate), zinc oxide and mixtures of zinc oxide and magnesium oxide. The resultant flame retardant is more effective than compositions wherein the weight ratio of hydrated stannic oxide to the second component is higher or lower than 1:4, respectively.

DETAILED DESCRIPTION OF THE INVENTION

The present flame retarding agents are applicable to a wide variety of halogen-containing synthetic polymers, such as halogenated polyolefins, polyvinyl chloride and copolymers containing vinyl chloride. The flame retardants are also useful for other polymers when combined with an organic halogen source. Suitable non-halogenated polymers include acrylonitrile-butadiene-styrene polymers, polyurethanes, polyethylene, polypropylene and polystyrene.

The present flame retardants contain one part by weight of hydrated stannic oxide and four parts of colemanite, zinc oxide, or mixtures of zinc oxide with magnesium oxide. The magnesium oxide is particularly useful in combination with zinc oxide for imparting heat stability to homopolymers and copolymers of vinyl chloride.

Acceptable levels of flame retardancy are obtained for all of the aforementioned synthetic polymers by replacing on an equal weight basis the conventional antimony compounds such as antimony oxide, with the present flame retardants. Specifically, the flame retardants are usually employed at concentrations of between about 0.5–25 phr (parts per hundred parts resin). A preferred range is determined by the particular polymer substrate being flame retarded. For example, if the polymer is polyvinyl chloride, or other chlorine-containing polyolefin, the concentration range is 0.5–10 phr. For non-halogenated polymers such as polyethylene and acrylonitrile-butadiene-styrene terpolymers, the preferred range of flame retardant concentration is between 4 and 25 phr. Polyurethanes require a lower concentration, usually between 4–14 phr, preferably about 10 phr of the flame retarding agent.

Hydrated stannic oxide imparts acceptable levels of flame retardancy to cellusloic materials, particularly fabrics, as disclosed in U.S. Pat. No. 1,990,292. However, the oxide is virtually ineffective as a flame retardant for synthetic polymers in the absence of an organic compound which functions as a source of halogen at flame temperatures. The halogen can be chlorine, bromine or iodine. The concentration of halogen source is equivalent to between one and about twelve times the weight of the present flame retarding agents. If the polymer being flame retarded contains a sufficient amount of halogen, i.e. about 20 percent by weight or more, no additional halogen source is required. Polyvinyl chloride contains 57 percent by weight of chlorine, and can therefore function as a halogen source.

In the event that an organic halogen source other than the substrate polymer is required, one can employ any organic halogen-containing compound that is not so volatile or heat sensitive as to boil or decompose below 300°C. Suitable organic halogen sources contain between 2 and 20 carbon atoms. Since halogenated hydrocarbons are usually the least expensive halogen sources, this class of compounds is preferred, although other classes of halogen-containing organic compounds such as alcohols, acids, esters, ketones and amines are also suitable. The hydrocarbon portion of the molecule can be aliphatic, cycloaliphatic or aromatic. Specific examples of preferred halogen sources include chlorinated paraffin waxes and compounds containing two or three fused carbocyclic rings, as represented by the formula

The following table lists some of the representative compounds from the various classes of halogen sources and the types of polymer substrates most suitable for use with these compounds.

CHLORINATED COMPOUNDS

| | USE |
|---|---|
| Alkanes | |
| Chloroethanes | Paint, polystyrene |
| Chloropropanes | Polyesters |
| Chlorinated $C_{10}$—$C_{30}$ paraffins | Paints, wood, textiles, polyolefins |
| Chlorinated fish oil | Paint |
| Chlorinated rubber | Rubber |
| Chlorinated PVC | Vinyls, textiles |
| Chlorinated polyisobutylene | Polyurethane |
| Chlorinated polyolefins | Polyolefins |
| Polyvinyl chloride | Textiles |
| Benzene hexachloride-$C_6H_6Cl_6$ | Cellulose derivatives |
| Olefins | |
| Chloroethylenes, vinyl chloride | Textiles, polystyrene, acrylics |
| Chloropropene | Polystyrene, vinyls, acrylics |
| Chlorobutene and butadiene | Rubber, vinyls |
| Chloroprene | Polyolefins |
| Vinyl chloroacetate | Polyesters, acrylics |
| Allyl chloride | Epoxies |
| Hexachlorocyclopentadiene and derivatives ("hex") | Paints, polyesters, polyurethanes, epoxies, polystyrene, acrylics |
| Chlorendic acid and derivatives | Polyesters, polyurethanes, epoxies, vinyls |
| Alcohols, acids, aldehydes and other functional compounds | |
| Chloroalcohols ($C_2$—$C_{12}$) and polyols | Vinyls, polyesters |
| Pentaerythritol chlorohydrin | Polyesters, polyurethane |
| Tetrachlorobutane-1,4-diol | Epoxies |
| Epichlorohydrin | Epoxies |
| 1,1,1-Trichloro-2,3 epoxypropane | Polyesters, polyurethane |
| Chloroadipic acid | Nylon, vinyls |
| Vinyl chloroacetate | Polyesters |
| Dichlorosuccinic acid | Polyurethane |
| Chlorinated fatty acids | Polystyrene |
| Chloral | Polyurethane, epoxies, polyaldehydes |
| Chloroalkyl acrylonitrile | Acrylics |
| Chlorinated aryldiamines | Epoxies |
| Aromatics | |
| Alkoxychlorobenzenes | Vinyls |
| Chlorinated hexamethylbenzene | Vinyls |
| Chlorinated alkylaryl ethers | Polyesters |
| Chlorophenols | Textiles, styrene, acrylics, wood phenolics, polyphenylenes |
| Pentachlorophenol glycidyl ether | Polyurethane epoxies |
| Chlorostyrenes | Polyesters, polystyrene, polyolefins |
| Chlorothiophenol esters | Acrylics, vinyls |
| Chlorinated 1,4-bis-hydroxymethyl benzene | Cellulosics, textiles |
| Chlorophenyl isocyanate | Textiles |
| Chlorobiphenyls and polyphenyls | Textiles, polyesters, polyurethane, polystyrene |
| Chlorinated 4,4'-bis-hydroxy-biphenyl | Polyesters |
| Chlorinated 3,3'-bis-isocyanato-biphenyl | Polyurethanes |
| Chlorinated naphthalenes | Textiles, polyesters |
| Chlorinated bisphenol A and glycidyl ethers | Polyesters, epoxies |
| Chlorinated diphenyl carbonate | Polycarbonates |
| Tetrachlorophthalic acid and derivatives | Textiles, polyesters |
| Chlorinated alkyd resins | Paints |
| Chloranil 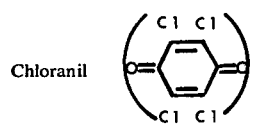 | Vinyls |
| Alkanes | |
| Bromoethanes | Vinyl Polymers |
| Bromocycloalkanes | Polyolefins |

CHLORINATED COMPOUNDS -continued

| | USE |
|---|---|
| Bromocycloalkanol, acrylic acid ester | Acrylic Polymers |
| Brominated polybutadiene | Vinyl and styrene polymers |
| Olefins | |
| Vinyl bromide | Polystyrene, acrylics |
| Tetrabromododecene | Polyesters |
| Hexabromobicycloheptene derivatives | Acrylics |
| Brominated cyclododecatriene | |
| Hexabromo cyclopentadiene | |
| Alcohols, acids, aldehydes and other functional groups | |
| 2,3,3-Tribromoallyl alcohol and esters (e.g., acrylate esters) | Polystyrene,vinyls |
| 2,2,3,3-Tetrabromobutane-1,4-diol | Polystyrene |
| Brominated pentaeythritol | Polyesters |
| Brominated polyols | Polyurethanes |
| 2,3-Dibromopropyl phthalate | Paper |
| Brominated tall oil | Polyurethanes |
| 2,2-Bis(bromomethyl)-1,3-propanediol | Polyesters |
| 2-Bromoethyl itaconate | Polystyrene, acrylics |
| Dibromosuccinic acid | Polyesters |
| Bromoacetaldehyde, bromo-benzaldehyde | Polyvinyl alcohol |
| Brominated amides —$BrCH_2$—R—$CONR^1R_2$, where R —$C_5$—$C_{21}$; $R^1$, $R^2$ are lower alkyls | Polyurethanes |
| Bis (2,3-dibromopropyl) malate | Polystyrene |
| Aromatics | |
| Brominated polyphenyls | Polyolefins |
| Pentabromotulene | Polyurethanes |
| Bromophenyl vinyl ether | Polyesters |
| Styrene dibromide | Polystyrene |
| Bromophenols, acrylate esters | Paints, polystyrene |
| Bromophenol, glycidyl ether | Polyesters |

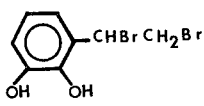

| | |
|---|---|
| | Polyesters |
| Bromotoluene di-isocyanate | Polyurethanes |
| Tetrabromophthalic acid or anhydride | Polyesters |
| Bromophthalimide | Nylon type polymers |
| Tetrabromobisphenol A | Epoxies |
| Brominated salicylanilide | |

Hydrated stannic oxide exhibits the general formula $SnO_2.0.5—2H_2O$. This compound is a more effective synergist than the anhydrous oxide when used in combination with colemanite or zinc oxide. This is surprising considering the fact that the anhydrous oxide has the higher tin content of the two (77 percent by weight of tin for the anhydrous oxide, compared with between 62 and 67 percent for the hydrated form).

Hydrated stannic oxide can be prepared by reacting stannic chloride with an aqueous solution of a basic salt such as sodium carbonate. The resultant precipitate is isolated and dried to obtain hydrated stannic oxide of the desired particle size. Since dehydration of the oxide to the anhydrous form occurs at a temperature above about 400°C., the product should not be exposed to these temperatures for any extended period of time during the drying operation.

The particle size of the present flame retarding agents are such that substantially all of the particles will pass through a 325 mesh screen of the U.S. standard screen series, which is equivalent to an average particle size of 44 microns.

An unexpected feature of the present flame retarding agents is the particularly high degree of activity obtained when the weight ratio of hydrated stannic oxide with respect to the other components, not including the halogen source, is about 1:4. Above or below this ratio the effectiveness of the combination as a flame retarding agent decreases significantly, as will be demonstrated in the accompanying examples. The reason for this phenomenon is not completely understood, however it appears that some enhanced degree of interaction among the various components of the flame retardant occurs when the combined weight of the other inorganic components, namely the colemanite, zinc oxide and magnesium oxide, is equal to about four times the weight of the hydrated stannic oxide.

One widely used method for determining the relative efficacy of various flame retarding agents is described in the American Society for Testing of Materials (ASTM) Test No. 1433–58. The test is performed by igniting a stream of butane gas eminiating from the aperture of a number 22 hypodermic needle. The tip of the resultant flame is placed within 0.5 inch of the test sample to be evaluated for flammability. The dimensions of the samples are 3 × 9 inches, and all exhibit the same average thickness. The sample to be tested is secured in a holder which together with the flame source is placed in an enclosure so as to minimize interfering air currents. A string is extended across the front of the sample and a second string is extended across the rear of the sample, the distance between the two strings being approximately 6 inches. The flame is then applied to the front edge of the sample, which is located 2 inches below the lower string. Samples wherein the flame burns through the lower string but is extinguished before reaching the upper string are designated as "self-extinguishing." If the flame is extinguished before the lower string is burned the sample is designated "non-burning." The length of the sample that burned was observed and recorded.

EXAMPLE 1

A polyvinyl chloride formulation of the following composition was prepared:

| | |
|---|---|
| 100 parts | PVC 450 - a vinyl chloride homopolymer manufactured by Diamond Shamrock Chemical Co. |
| 40 parts | Dioctylphthalate |
| 5 parts | Epoxidized soybean oil |
| 2 parts | Heat stabilizer containing compounds of barium and cadmium, as well known |
| 0.5 parts | Stearic acid |
| Flame Retardant | As specified |

The formulation was blended on a heated 2-roll mill to form a homogeneous mixture. Test samples of the desired dimensions were obtained by pressing the resultant sheet to an average thickness of 15 mils (0.015 inch) and cutting the sheet to obtain 3 by 9 inch sample. The samples were tested according to ASTM Test 1433-58 as described in the preceding specification. The length of sample burned prior to extinction of the flame was recorded and the results are summarized in Table 1. All parts are based on 100 parts by weight of polyvinyl chloride.

TABLE 1

| Sample No. | Hydrated Stannic Oxide (parts) | Zinc Oxide (parts) | Colemanite (parts) | Inches of Sample Burned |
|---|---|---|---|---|
| 1(control) | — | — | — | 6.0 |
| 2(control) | 1 | — | — | 2.1 |
| 3(control) | 2 | — | — | 1.9 |
| 4(control) | 5 | — | — | 1.4 |
| 5(control) | — | 1 | — | 2.3 |
| 6(control) | — | 2 | — | 3.4 |
| 7(control) | — | 5 | — | 1.6 |
| 8(control) | — | — | 1 | 5.3 |
| 9(control) | — | — | 2 | 2.1 |
| 10(control) | — | — | 5 | 2.1 |
| 11 | 1 | 4 | — | 1.4 |
| 12(control) | 1 | 2 | — | 1.5 |
| 13(control) | 1 | 3 | — | 1.7 |
| 14(control) | 1 | 5 | — | 1.7 |
| 15(control) | 2 | 5 | — | 1.7 |
| 16(control) | 2 | 4 | — | 1.5 |
| 17 | 0.5 | 2 | — | 1.7 |
| 18 | 1.5 | 6 | — | 1.1 |
| 19 | 1 | — | 4 | 1.3 |
| 20(control) | 1 | — | 2 | 1.4 |
| 21(control) | 1 | — | 3 | 1.4 |
| 22(control) | 1 | — | 5 | 1.5 |
| 23(control) | 1 | — | 6 | 1.7 |
| 24 | 0.5 | — | 2 | 1.7 |
| 25 | 1.5 | — | 6 | 1.0 |
| 26 | 2 | — | 8 | 1.0 |

Sample No. 11, which exemplifies a composition of this invention, was significantly less flammable than samples 12, 13 or 14, all of which contained 1 phr of hydrated stannic oxide with various amounts of zinc oxide. Sample 11 burns less than sample 14, even though the latter contains 6 phr of the flame retardant but is not within the scope of the present invention. Moreover, sample 17, which contains only 2.5 phr of flame retardant but exhibits a 1:4 weight ratio between the hydrated stannic oxide and zinc oxide, is equivalent in performance to sample 14.

Of the samples containing hydrated stannic oxide and colemanite, sample 19 is superior to sample 22 with regard to inhibiting flame spread, even though the former contains less flame retardant. Sample 24, containing only 2.5 phr of flame retardant, is equivalent in performance to sample 23 which contains 7 phr of the hydrated stannic oxide-colemanite mixture.

The data in Table 1 demonstrate that a particularly favorable interaction between the two components of the flame retardant occurs when the weight of the hydrated oxide is one-fourth of the weight of the second component.

EXAMPLE 2

This examples demonstrates the use of three mixtures containing zinc oxide and magnesium oxide as the second component of the present flame retardants for polyvinyl chloride. The samples were prepared and tested as described in the preceding specification. The values for flame spread (length of sample burned) given below represent the average obtained from 5 samples.

| FLAME RETARDANT COMPONENTS (phr) | FLAME SPREAD (inches) |
|---|---|
| Hydrated stannic Oxide (1) Zinc Oxide (1) Magnesium Oxide (3) | 1.35 |
| Hydrated Stannic Oxide (1) Zinc Oxide (2) Magnesium Oxide (2) | 1.35 |
| Hydrated Stannic Oxide (1) Zinc Oxide (3) Magnesium Oxide (1) | 1.34 |

In addition to enhancing the flame retardancy imparted by the combination of hydrated stannic oxide and zinc oxide, magnesium oxide increases the resistance of polyvinyl chloride to heat induced degradation.

EXAMPLE 3

This example demonstrates the efficacy of the present flame retardants in combination with a halogen source as flame retardants for polyethylene. The formulation employed to prepare the test samples contained 100 parts of polyethylene (type NA 285, produced by U.S. Industries), 8 parts of a chlorinated paraffin containing 70 percent by weight of chlorine (Chlorowax 70S produced by Diamond Shamrock Chemical Co., 8 parts of pentaerythritol as a heat stabilizer and a flame retardant as specified in the following Table 2. The polyethylene was blended with the additives using a two-roll mill heated to 110°C. The resultant sheet was pressed to a thickness of ⅛ inch and cut into test samples measuring 6 inches long by ⅛ inch wide. The flame retardancy of the various samples was determined using Limiting Oxygen Index (L.O.I.) values.

The procedure for obtaining L.O.I. values is described in the November, 1966 issue of *Modern Plastics* at pages 141–148 and 192. The test samples are placed in a vertically oriented Pyrex glass tube, approximately 3.5 inches in diameter, which has a bed of glass beads located at the bottom thereof and a smaller Pyrex glass tube of approximately 7 mm. in diameter located concentrically with respect to the larger tube. The samples are suspended above the smaller tube. A known mixture of oxygen and nitrogen is introduced at the bottom of the larger tube and flows up through the glass beads. The flow of each gas is controlled and monitored by means of valves and flow meters.

The sample is ignited and the minimum concentration of oxygen required to support combustion is noted. The Limiting Oxygen Index is calculated using this minimum oxygen concentration and the formula $$\frac{[O_2]}{[O_2] + [N_2]} \times 100$$

wherein $[O_2]$ and $[N_2]$ represent the relative amounts of oxygen and nitrogen, respectively, expressed in any convenient units such as flow rate in cubic centimeters per minute.

Samples with an oxygen index of 21.0 or less will burn readily in air while oxygen indeces increasingly greater than 21.0 indicate that the sample would burn with greater difficulty, if at all, in air. Polyethylene without any flame retardant has an oxygen index of 17.3 plus or minus 0.1. It will be noted from the following table that a polyethylene formulation containing one of the present two-component systems of hydrated stannic oxide with either zinc oxide or colemanite, exhibits a limiting oxygen index of 20.5 or above indicating that the samples would burn only sluggishly in air, if at all.

TABLE 2

| SAMPLES | 1 | 2 | 3 | 4 | 5 | 6 |
|---|---|---|---|---|---|---|
| Hydrated Stannic Oxide (phr) | 2 | 3 | 4 | 2 | 3 | 4 |
| Colemanite(phr) | 8 | 12 | 16 | — | — | — |
| Zinc Oxide (phr) | — | — | — | 8 | 12 | 16 |
| L.O.I. value(average of two samples) | 20.5 | 20.7 | 20.4 | 21.4 | 21.9 | 21.4 |

EXAMPLE 4

This example demonstrates the efficacy of the present composition in reducing the flammability of acrylic polymers, specifically an acrylonitrile-butadiene-styrene (ABS) terpolymer.

Test samples were prepared and evaluated using Limiting Oyxgen Index values as described in Example 3. The formulations employed to prepare the test samples contained 100 parts by weight of the ABS terpolymer, 25 parts of perchloropentacyclodecane and 1.2 parts of a diorganotin maleate stabilizer in addition to the flame retardants specified in the following Table.

TABLE 3

| SAMPLES | 1 | 2 | 3 | 4 | 5 | 6 | 7 | 8 | 9 |
|---|---|---|---|---|---|---|---|---|---|
| Hydrated Stannic Oxide (phr) | 2 | 3 | 4 | 5 | 2 | 3 | 4 | 5 | 0 |
| Colemanite(phr) | 8 | 12 | 16 | 20 | — | — | — | — | 0 |
| Zinc Oxide(phr) | — | — | — | — | 8 | 12 | 16 | 20 | 0 |
| L.O.I. value (average of two samples) | 22.8 | 22.0 | 21.7 | 22.3 | 21.6 | 23.0 | 22.9 | 24.0 | 18.8 |

EXAMPLE 5

This example demonstrates the flame retardancy imparted to polyurethane foams by the present combinations of hydrated stannic oxide with either zinc oxide or colemanite.

The composition used to prepare the polymer contained 100 parts by weight Poly G-435-DM (a polyfunctional polyoxy propylene polymer based on methyl glucoside and obtained from Olin Chemicals), Papi (polymethylene polyphenylisocyanate, manufactured by the Carwin Company) in the amount of 109 parts, 1.5 parts DC-193(a dimethyl siloxysiloxane type surfactant by Dow Corning), 1 part dimethyl ethanol amine, 1 part dibutyltin dilaurate, 32 parts trichlorofluoromethane and 10 parts of a halogen source (either No. 23010, manufactured by Marbon Chemical Corp. and containing 68% chlorine or the Diels Alder adduct of hexachlorocyclopentadiene and 1,4 dichlorobutene). The foam was prepared by combining all of the ingredients except the isocyanate and mixing well. Thereafter, the isocyanate was added with additional mixing and the product poured into a container and allowed to rise. The foams were evaluated for flame retardancy as described in ASTM Test D-1692-67-T. Each of the samples containing the present flame retardants was rated self-extinguishing when tested according to this procedure. The test is performed by applying the flame of a Bunsen burner having a blue cone of about 1½ inches in height to the front edge of a ten foam samples measuring 6 inches by 2 inches by ½ inch and allowing the flame to remain in contact with the sample for 60 seconds. The extent of burning is considered to be the furthest point reached by the flame front measured from the front edge, whereas the burning rate in inches per minute is a measure of the time necessary for the flame to consume 5 inches of the foam sample. A sample is judged non-burning if no evidence of ignition, which includes both a flame and a progressive glow, is seen in each sample after removing the igniting flame. If the flame front of two or more specimens reaches the 5 inch mark the sample is judged burning. A sample is judged self-extinguishing if the length burned is less than 5 inches. The average extent of burning for the samples tested is summarized in the following table, wherein all concentrations are expressed in parts by weight per 100 parts of the polyol component (Poly G-435-DM) of the foam.

TABLE 4

| FORMULATION | 1 PHR | 2 PHR | 3 PHR | 4 PHR | 5 PHR | 6 PHR | Control PHR |
|---|---|---|---|---|---|---|---|
| No. 23010 (halogen source) | 10 | 10 | 10 | — | — | — | — |
| Hydrated Stanic Oxide | — | 10 | 2 | — | 10 | 2 | — |
| Zinc Oxide | — | — | 8 | — | — | 8 | — |
| Diels Alder Adduct (halogen source) | — | — | — | 10 | 10 | 10 | — |
| Extent of Burning* | 6" | 2" | 1" | 2" | 6" | 1" | 6" |

*Average of ten specimens

The formulations which have incorporated therein the combination of hydrated stannic oxide, zinc oxide and one of the two alternative halogen sources yield a self-extinguishing rating. In those instances when the form contained only the No. 23010 halogen source, the samples were rated as burning. The samples containing the No. 23010 halogen source and hydrated stannic oxide exhibited an average burned length of 2 inches, whereas a similar composition containing zinc oxide burned for only 1 inch.

What is claimed is:

1. A polymer composition exhibiting enhanced flame retardancy, wherein the polymer is selected from the group consisting of polyvinyl chloride, polyvinylidene chloride and copolymers of vinyl chloride and vinylidene chloride with one another and with ethylenically unsaturated monomers, wherein said polymer composition contains between 0.5 and 10 parts by weight per 100 parts of said polymer of a flame retardant containing 20 percent by weight of hydrated stannic oxide and 80 percent by weight of a second component selected from the group consisting of colemanite, zinc oxide and mixtures of zinc oxide and magnesium oxide.

2. The polymer composition of claim 1 wherein the polymer is polyvinyl chloride.

3. A polymer composition exhibiting enhanced flame retardancy wherein the polymer contains no halogen as an integral part thereof and is selected from the group consisting of polyolefins, acrylic polymers and polyurethanes, and wherein the polymer composition contains 1) a flame retarding agent consisting of 20 percent, based on the weight of said flame retarding agent, of hydrated stannic oxide, the remaining 80 percent selected from the group consisting of colemanite, zinc oxide and mixtures of zinc oxide and magnesium oxide and 2) between 1 and 12 times the weight of said flame retarding agent of an organic halogen compound.

4. The polymer composition of claim 3 wherein the organic halogen compound does not boil or decompose at temperatures below 300°C.

5. The polymer composition of claim 4 wherein the organic halogen compound contains more than 20 percent by weight of said halogen.

6. The polymer composition of claim 4 wherein said organic halogen compound is selected from the group consisting of halogenated aliphatic, cycloaliphatic and aromatic hydrocarbons.

7. The polymer composition of claim 4 wherein the halogen is chlorine.

8. The polymer composition of claim 3 wherein the organic halogen compound is a chlorinated paraffin wax or a chlorinated bicyclic hydrocarbon.

9. A composition for imparting flame retardancy to a material selected from the group consisting of a) halogen-containing synthetic organic polymers and b) non-halogen-containing organic polymers in combination with an organic halogen source, said composition consisting essentially of hydrated stannic oxide and a second component selected from the group consisting of colemanite, zinc oxide and mixtures of zinc oxide and magnesium oxide wherein the weight ratio of zinc oxide to magnesium oxide is between 1:3 and 3:1, respectively, and the weight ratio of hydrated stannic oxide to said second component is 1:4, respectively.

* * * * *